United States Patent
Werner

(10) Patent No.: US 7,500,382 B2
(45) Date of Patent: Mar. 10, 2009

(54) DETECTION OF LEAKS IN HEAT EXCHANGERS

(75) Inventor: Thomas Werner, Somerset (GB)

(73) Assignee: Accusense Systems Limited, Somerset (GB)

( * ) Notice: Subject to any disclaimer, the term of this patent is extended or adjusted under 35 U.S.C. 154(b) by 47 days.

(21) Appl. No.: 10/551,812

(22) PCT Filed: Apr. 1, 2004

(86) PCT No.: PCT/GB2004/001409

§ 371 (c)(1),
(2), (4) Date: Sep. 25, 2006

(87) PCT Pub. No.: WO2004/088269

PCT Pub. Date: Oct. 14, 2004

(65) Prior Publication Data

US 2007/0125156 A1    Jun. 7, 2007

(51) Int. Cl.
G01M 3/20    (2006.01)
G01M 3/38    (2006.01)

(52) U.S. Cl. ............ 73/46; 73/40.5 R; 73/49.2
(58) Field of Classification Search ............... 73/40.7, 73/40, 40.5 R, 45.5, 45.8, 49.2
See application file for complete search history.

(56) References Cited

U.S. PATENT DOCUMENTS

| 5,070,723 A | 12/1991 | Tsou et al. | |
| 5,574,213 A * | 11/1996 | Shanley | 73/40.7 |
| 6,009,745 A | 1/2000 | Shaw et al. | |
| 2003/0056572 A1 * | 3/2003 | Werner | 73/40.7 |

FOREIGN PATENT DOCUMENTS

WO    WO/0142756    6/2001

* cited by examiner

Primary Examiner—David A. Rogers
(74) Attorney, Agent, or Firm—Clark & Brody

(57) ABSTRACT

A method for the detection of leaks in a heat exchanger having discrete flow paths for working fluid and heat exchange fluid, respectively, the method comprises introduction of a detection fluid within one of said flow paths and allowing air to flow through the other of said flow paths causing the detection fluid to pass in different directions in said one flow path, and detecting any detection fluid which has leaked from one flow path to said other flow path.

15 Claims, 2 Drawing Sheets

DETECTION OF LEAKS IN HEAT EXCHANGERS

This invention relates to heat exchangers and provides an improved method for detection of leaks therein and for determining the location of any leak thus detected.

The invention is particularly, but not exclusively, for use with heat exchangers which operate for heating or cooling purposes in "clean" environments, such as in the food, dairy, brewing and pharmaceutical industries.

WO 01/42756 describes a method for the detection of leaks in a plate pack heat exchanger, the method comprising introducing helium to one flow path of the heat exchanger and using a helium detector probe in the other flow path to detect any helium which has entered the other flow path through a leak, air being caused to flow through the path containing the helium detector probe and the pressure in the helium-containing flow path being higher than that in the detector probe path. The method provides a test result after only a short period of operation, and can be used in the presence of water or other liquid. However, air pockets can occur within the heat exchanger, depending on the geometry of the flow paths and, in some circumstances, the presence of liquid therein.

It is an object of the present invention to provide a method in which the above problems are avoided.

According to one aspect of the invention, a method for the detection of leaks in a heat exchanger having discrete flow paths for working fluid and heat exchange fluid, respectively, comprises introduction of a detection fluid within one of said flow paths, passing the detection fluid in different directions in said one flow path, and detecting any detection fluid which has leaked from said one flow path to said other flow path.

The method of the invention may be applied either to plate pack heat exchangers or to tubular heat exchangers.

Preferably, the detection fluid is introduced in one flow path and air is allowed to flow through the other flow path.

Preferably, the one flow path in which the detection fluid is introduced is the heat exchange fluid path, the detection of detection fluid then taking place in the working fluid flow path.

In one embodiment the detection fluid comprises a gas comprising helium and the pressure in one flow path is higher than in the other flow path.

The gas comprising helium may be pure helium but the invention is efficient with commercially-available mixtures of helium and air, which are thus preferred for economic reasons. Such mixtures are typically available at concentrations of 96-98% helium, balance air.

The passage in different directions of the helium-comprising gas in the one flow path is typically carried out for a few, say five or ten, minutes in each direction until the helium is uniformly distributed throughout said flow path, thereby eliminating air pockets which otherwise, if adjacent a leak, would give rise to a spurious test result.

Preferably, the method includes in a further aspect the step of introducing a fluorescent dye into one of said flow paths and allowing the dye to become distributed throughout said flow path and, thereafter, inspecting the heat exchanger from the other side from that which defines said flow path with fluorescent-responsive detection means to identify the source of a leak.

The method of the further aspect is of course only required to be carried out on a heat exchanger which has already been found to have a crack, perforation or other leak by the method according to the first aspect, or by any other leak-detection method. However, the method according to the further aspect may itself be used to detect leaks and to identify the source thereof.

In an alternative embodiment the detection fluid comprises a fluorescent dye which itself is used to detect leaks and to identify the source thereof.

When introducing the fluorescent dye to the heat exchanger, the heat exchanger should preferably previously have been drained of any trapped water or any other liquid. To this end, the plates of a plate pack heat exchanger may initially be disassembled and any liquid therein drained away, whereafter the heat exchanger may be reassembled and the fluorescent dye introduced. Circulation of the fluorescent dye within the heat exchanger typically takes place for a period of time between ten and forty-five minutes to allow the dye to become distributed throughout the flow path, preferably at a pressure between 10 and 25 psi. Preferably, the dye is circulated in one direction and then the opposite direction to improve or enhance plate coverage, up to substantially 100% coverage of the plate by the dye. The dye may leak through any defects in the plate by capillary action. Preferably, a developer spray can be used to draw the dye through any defects in the plate. The heat exchanger may then again be disassembled and surplus dye allowed to drain away, following which the individual plates can be viewed on the opposite side from that in which the dye was circulated, to identify any perforations or cracks. This may be done using an ultraviolet (black) light of wavelength of nominally 365 nm. The defective plates may then be repaired or replaced.

For a tubular heat exchanger, each individual tube would generally be treated in a similar way to that described above with reference to plate pack heat exchangers.

Embodiments of the invention will now be described by way of example with reference to the accompanying drawings, of which FIG. 1 illustrates a plate pack heat exchanger adapted for being tested for the presence of leaks;

Figure 1:
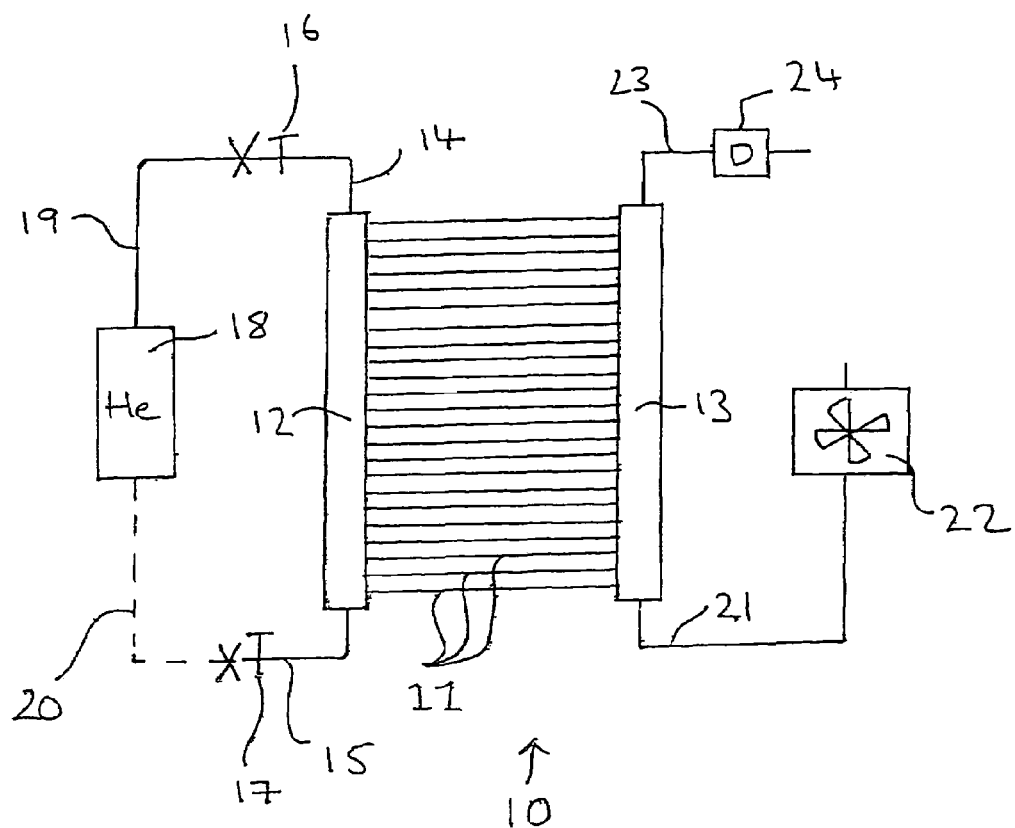

With reference firstly to FIG. 1, a plate pack heat exchanger, shown generally at 10, includes heat exchange elements in the form of plates 11 extending between primary and secondary chambers 12, 13 respectively. The chambers are in intimate thermal contact with each other via the plates but are intended to be isolated from each other for mass transfer.

As illustrated, the chamber 12 may be designated for passage of a heat exchange fluid and chamber 13 may be designated for passage of a working fluid to be heated or cooled, as the case may be, by the heat exchange fluid via the plates. Each chamber will have inlets and outlets (not shown in the drawings) for inlet and outlet of relevant fluid.

Chamber 12 is equipped with conduits 14, 15 and associated isolation valves 16, 17. A source 18 of helium gas, typically as a mixture with air, is shown attached to conduit 14 but may, alternatively and selectively, be attached to conduit 15 via line 20, whereby the helium source is placed in communication either with one end or the other of the chamber 12. Attached to chamber 13 is an inlet compressed airline 21 connected to an air compressor 22; at the other end, the chamber 13 is connected via line 23 to a helium detector probe which filters helium from the air stream and measures the pressure thereof.

In use, helium is initially flushed through chamber 12 via line 19 and conduit 14, taps 16 and 17 being open. Once a flow of helium is established, tap 17 is closed and helium continues to be passed for a few minutes to chamber 12; tap 16 is then closed and tap 17 is opened, helium then being allowed to pass in reverse flow through chamber 16 via line 20 and conduit 15. Any air pockets within chamber 16 are thus eliminated and, eventually, helium is evenly distributed throughout chamber 16. Any leaks in the plates 11 will allow helium to pass to chamber 13 where it will become entrained in the airflow from compressor 22 and detected by probe 24.

Figure 2:
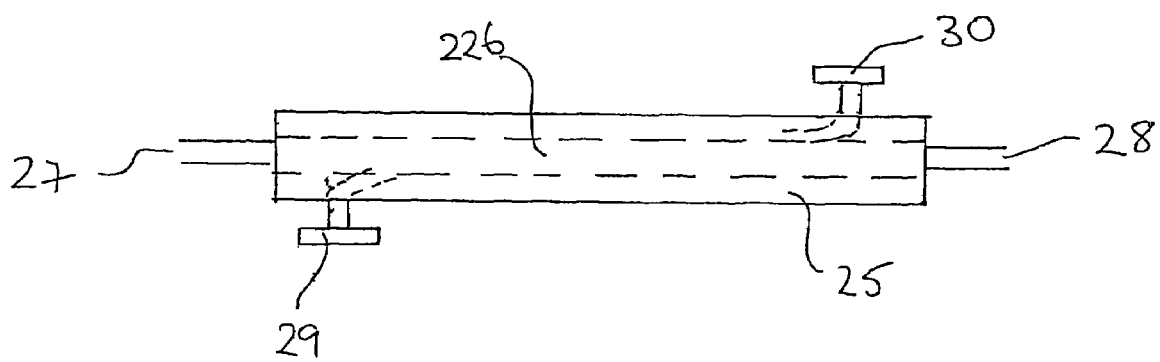
FIG. 2 shows a tubular heat exchanger.

Turning now to FIG. 2, a tubular heat exchanger has an outer jacket 25 and an internal tube 26 with end connections 27, 28. Connectors 29, 30 communicate with the interior of the jacket. In use, helium is passed through the internal tube and air is passed through the jacket at tested for the presence of helium, in the same manner as described with reference to FIG. 1.

Figure 3:
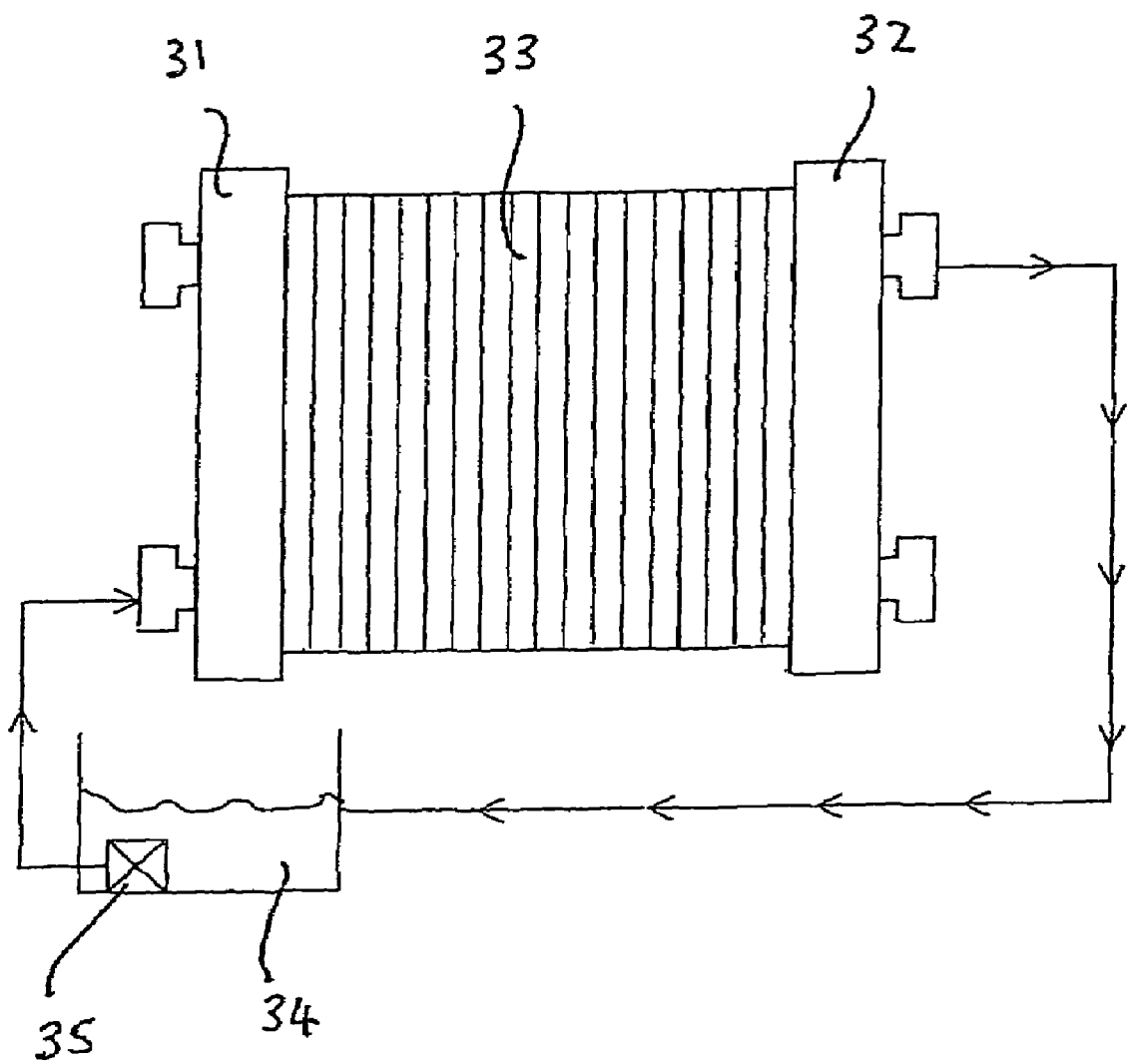
FIG. 3 shows a plate pack heat exchanger adapted for passage of a fluorescent dye.

With reference to FIG. 3, a plate pack heat exchanger has respective chambers 31, 32 connected by plates 33. A source of fluorescent dye is contained in a header tank 34 and circulated by means of a submerged pump 35 through one fluid circuit of the heat exchanger, preferably that circuit which normally accommodates the heat exchanger fluid. The fluorescent dye is allowed to circulate for, say, thirty minutes, following which the heat exchanger is dismantled, the plates are allowed to drain of liquid and the individual plates are then examined, from the working fluid side, for the presence of fluorescent dye revealing the existence of any leak and the precise location thereof. The existence of any leaks may be detected by ultraviolet light of wavelength of normally 365 nm.

The invention claimed is:

1. A method for the detection of leaks in a heat exchanger having discrete flow paths for working fluid and heat exchange fluid, respectively, the method comprising introduction of a detection fluid within one of said flow paths, passing the detection fluid in different directions in said one flow path, and detecting any detection fluid which has leaked from said one flow path to said other flow path, in which the detection fluid comprises a fluorescent dye and the detection fluid is detected using a fluorescent-responsive detection means, and the heat exchanger is a plate pack heat exchanger, in which the heat exchanger is disassembled following the dye distribution step, whereby the inspecting step is carried out on individual plates.

2. A method according to claim 1, in which a detection fluid is introduced in one flow path and air is allowed to flow through the other flow path.

3. A method according to claim 2, in which the one flow path in which the detection fluid is introduced is the heat exchange fluid path, the detection of leaked detection fluid taking place in the working fluid flow path.

4. A method according to claim 2, in which the detection fluid is a gas comprising helium and the pressure in one flow path is higher than the other flow path.

5. A method according to claim 2, in which the detection fluid comprises a fluorescent dye.

6. A method according to claim 1, in which the one flow path in which the detection fluid is introduced is the heat exchange fluid path, the detection of leaked detection fluid taking place in the working fluid flow path.

7. A method according to claim 6, in which the detection fluid is a gas comprising helium and the pressure in one flow path is higher than the other flow path.

8. A method according to claim 6, in which the detection fluid comprises a fluorescent dye.

9. A method according to claim 1, in which the detection fluid is a gas comprising helium and the pressure in one flow path is higher than the other flow path.

10. A method according to claim 9, in which the gas comprising helium is a mixture of helium and air in a concentration of 96-98% helium.

11. A method according to claim 10, including the step of introducing a fluorescent dye into one of said flow paths and allowing the dye to become distributed throughout said flow path and, thereafter, inspecting the heat exchanger from the other side from that which defines said flow path with fluorescent-responsive detection means to identify the source of a leak.

12. A method according to claim 9, including the step of introducing a fluorescent dye into one of said flow paths and allowing the dye to become distributed throughout said flow path and, thereafter, inspecting the heat exchanger from the other side from that which defines said flow path with fluorescent-responsive detection means to identify the source of a leak.

13. A method for the detection of leaks in a heat exchanger having discrete flow paths for working fluid and heat exchange fluid, respectively, the method comprising introduction of a detection fluid within one of said flow paths, passing the detection fluid in different directions in said one flow path, and detecting any detection fluid which has leaked from said one flow path to said other flow path, including the step of introducing a fluorescent dye into one of said flow paths and allowing the dye to become distributed throughout said flow path and, thereafter, inspecting the heat exchanger from the other side from that which defines said flow path with fluorescent-responsive detection means to identify the source of a leak, the heat exchanger being a plate pack heat exchanger, in which the heat exchanger is disassembled following the dye distribution step, whereby the inspecting step is carried out on individual plates.

14. A method for the detection of leaks in a heat exchanger having discrete flow paths for working fluid and heat exchange fluid, respectively, the method comprising introduction of a detection fluid within one of said flow paths, passing the detection fluid in different directions in said one flow path, and detecting any detection fluid which has leaked from said one flow path to said other flow path, wherein the detection fluid is a fluorescent dye and the heat exchanger being a plate pack heat exchanger, in which the heat exchanger is disassembled following the dye distribution step, whereby the inspecting step is carried out on individual plates.

15. A method according to claim 14, in which the fluorescent dye is detected using a fluorescent-responsive detection means.

* * * * *